Sept. 15, 1936.  H. HOLZWARTH  2,054,081
EXPLOSION GAS TURBINE AND METHOD OF OPERATING SAME
Filed June 8, 1932     4 Sheets-Sheet 1
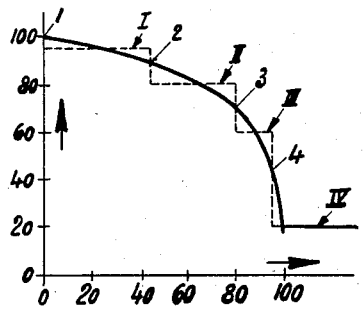
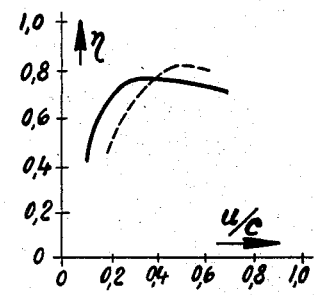
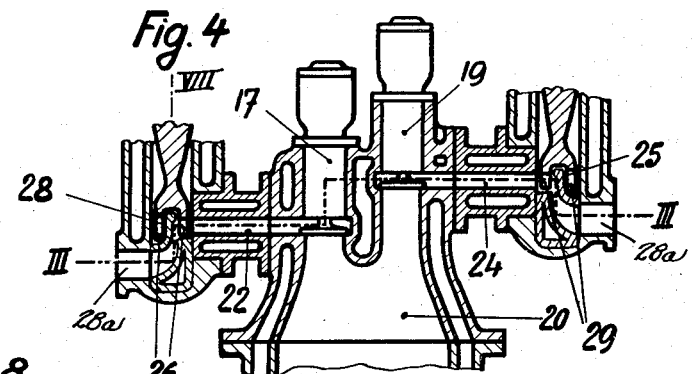
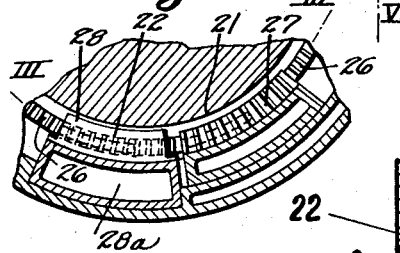
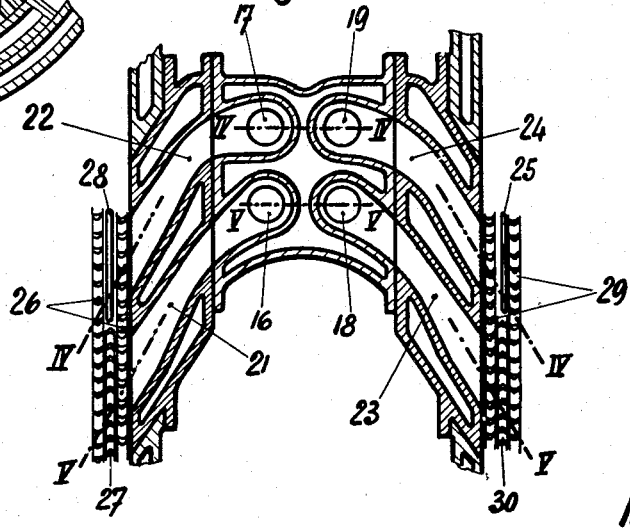
Inventor
Hans Holzwarth

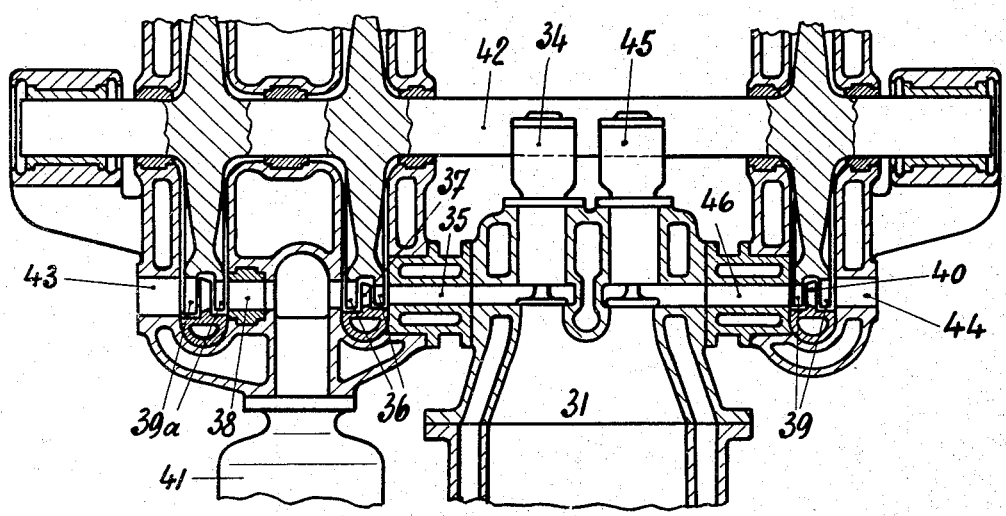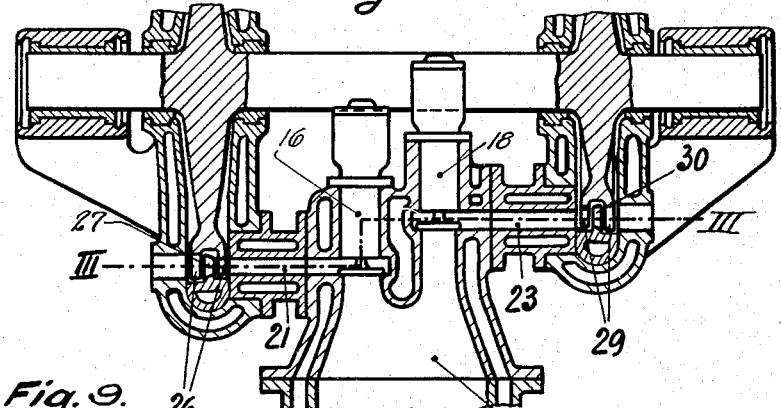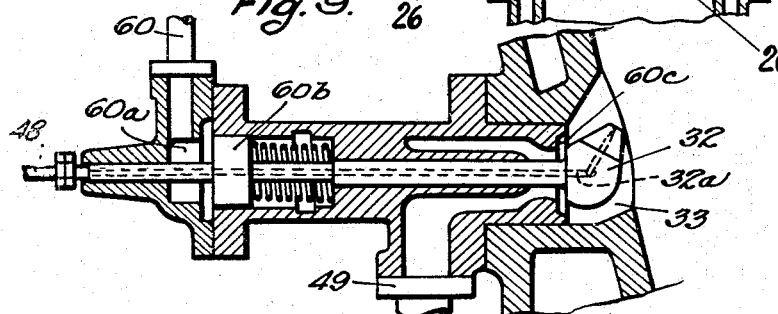

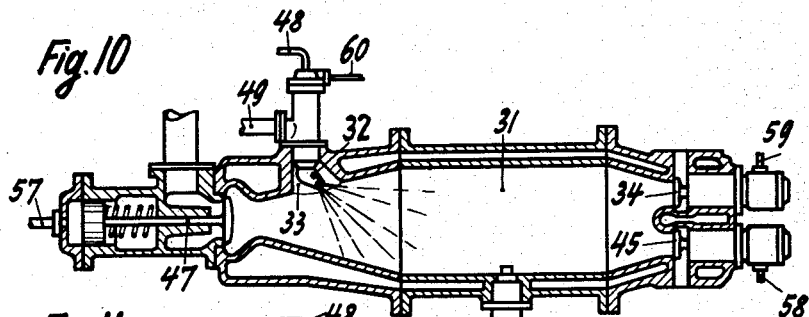
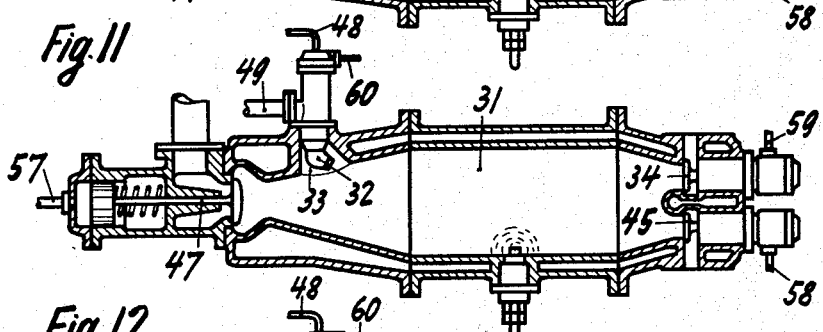
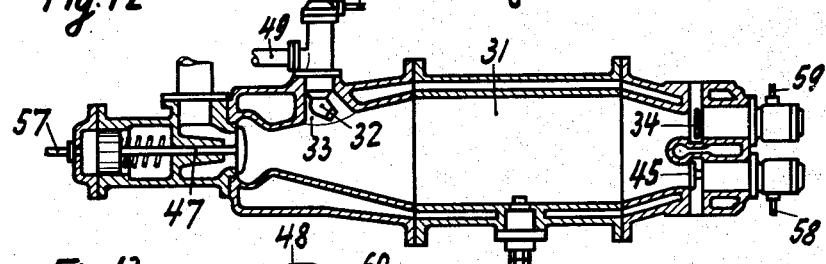
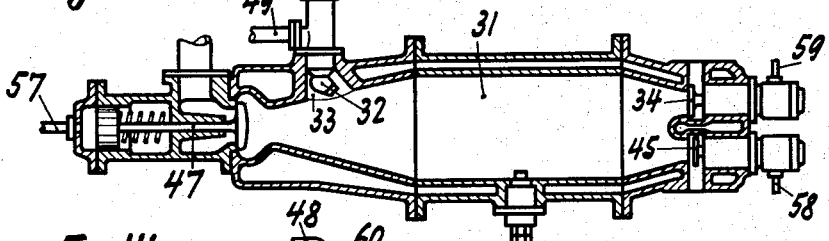
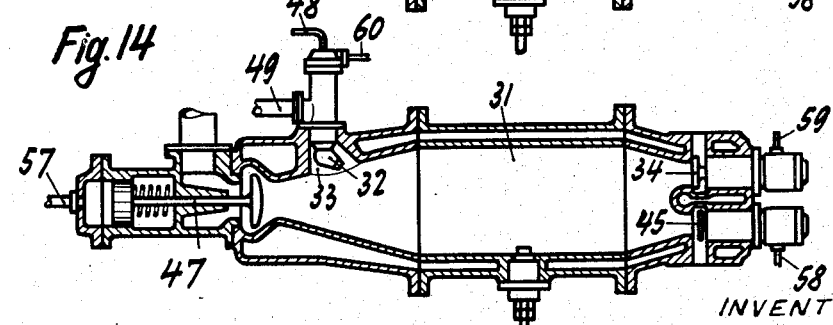

Patented Sept. 15, 1936

2,054,081

UNITED STATES PATENT OFFICE 2,054,081

EXPLOSION GAS TURBINE AND METHOD OF OPERATING SAME

Hans Holzwarth, Dusseldorf, Germany, assignor to Holzwarth Gas Turbine Co., San Francisco, Calif., a corporation of Delaware Application June 8, 1932, Serial No. 616,059
In Germany June 12, 1931

4 Claims.  (Cl. 60—41)

The present invention relates to explosion turbine plants, and more particularly to the manner of utilizing the heat and pressure energy of the explosion gases generated in the constant volume explosion chamber or chambers forming part of such plants.

In the explosion process embodied in explosion turbine plants, the pressure and consequently the velocity of the gases generated in every working cycle of an explosion chamber fall rapidly as they are discharged through the outlet valve of such chamber for use in the turbine or turbines. This fall in the flow velocity has two disadvantages. First, the high velocities, which lie above the critical velocity, make necessary the use of expansion nozzles. Now the necessary nozzle flare varies with the velocity, so that if the nozzle flare were determined according to the highest occurring velocity, which exists at the beginning of the discharge of the explosion gases from the chamber, then the nozzle would operate at poor efficiency as soon as the velocity has fallen to a lower value. If, conversely, the expansion ratio of the nozzle were determined for the lower flow velocity, then the nozzle efficiency would be low at the high velocities occurring at the beginning of a discharge from a chamber. Changes in the gas velocity thus cause sharp fluctuations in the efficiency of the nozzle. However, change in the flow velocity is accompanied not only by a change in the nozzle efficiency but also in the rotor efficiency. It is known that this rotor efficiency is dependent upon the relation between the circumferential velocity of the rotor and the flow velocity of the gases. This relation varies very considerably with falling gas velocity, since the circumferential rotor velocity itself remains constant, so that corresponding fluctuations in rotor efficiency result.

The present invention provides an improved mode of operation and improved apparatus whereby the above-mentioned disadvantages are overcome and the explosion gases utilized at a higher efficiency. According to the invention, the explosion gases generated at every working cycle of an explosion chamber are divided into at least two portions discharging one after the other, such portions being directed into different nozzles and being fed to a plurality of rotor bladings independently of each other, the different nozzles being dimensioned, particularly as regards their expansion relationships, in accordance with the different conditions of the respective gas portions. Upon utilization of these gas portions there thus results a uniform high nozzle efficiency.

In a further development of the invention, each combustion gas portion can be conducted through turbine stages whose rotors have peripheral velocities which with reference to the velocities of the respective gas portions are at the optimum values for yielding the highest rotor efficiencies. In this way there results, in addition to the uniformly high nozzle efficiency, also a uniformly high rotor efficiency. The process can be so conducted that the gas portions, or at least two of them, are worked to the same counter pressure, so that the temperature stresses in the different turbine parts are small and uniform. The greater the number of portions into which the gas quantity produced in a chamber during each cycle is divided, and the greater the number of different nozzles and turbines in which the gas portions are independently utilized, the higher will be the over-all efficiency, but it will be apparent that the independent utilization of numerous gas portions is limited by the resulting multiplication of nozzle and rotor systems.

The invention contemplates also the utilization of two or more gas portions in a single rotor without sacrificing the desired adaptation of the blading to the changed flow velocity. This phase of the invention rests upon the recognition that a rotor having a single ring of blades yields approximately the same efficiency at reduced velocities, that is, at an increased ratio between peripheral velocity and gas velocity, as, for example, a two blade ring rotor which is struck at the same peripheral velocity by combustion gases at higher velocity. What has been said for one and two blade ring rotors applies naturally also to rotors with more rings of blades. In accordance with the invention, therefore, where gas portions are worked in a common, multi-ringed rotor, the rear blade rings of the rotor may be shielded more and more for portions of smaller flow velocity corresponding to their decrease in velocity, and in this way the adaptation of the rotor to the diminishing velocity of the partially exhausted portions is attained.

The present invention also provides measure for overcoming the unfavorable results arising from the fact that especially at the beginning of the expansion the velocities are high when the total pressure or heat drop of the explosion gases is utilized in a single pressure stage. As higher and higher charging pressures in the explosion turbine are used, resulting in a geometrical increase in the explosion pressures, these velocities take on such values that they can no longer be balanced by corresponding increase of the peripheral speed of the turbine rotor. On the other hand, the pressure and heat drop in the latter portions of the expansion fall to such a degree that a single turbine stage suffices to utilize the same. Referring now to the previously described division into successive portions of the explosion gases produced in every cycle of an explosion chamber and the utilization of these portions in several nozzles and bladings which are designed as regards their expansion ratios and peripheral speeds according to the different velocities of the gas portions, the present invention contemplates further a division or splitting of the pressure or heat drop so as to avoid unfavorable relations between peripheral and flow velocities.

In a further development of the present invention, it is therefore proposed to divide the individual portions of explosion gases produced in every cycle of an explosion chamber and utilized independently of each other, according to their pressure drop, and to utilize some portions in pressure stages and to permit the remaining portions, without splitting the pressure drop, to strike each a pressure stage which in its dimensions is fitted to the condition of the gas portion utilized by it. In accordance with the invention, therefore, the highly compressed portions of the explosion gases are divided according to their pressure drop and utilized in different pressure stages, while the portions of low pressure are employed without pressure drop division for operating each a pressure stage dimensioned in correspondence with the condition of the gas portion utilized by it. The high velocities occurring at the beginning of the expansion can thus be considerably reduced by division of the pressure drop and can be utilized without difficulty in the rotors of each turbine pressure stage, while in the second part of the expansion the working of the gases occurs in a single pressure stage which, corresponding to the decreased flow velocity, can have different nozzle expansion ratios and different peripheral speeds. The process can be greatly simplified when the high pressure portions strike, as the last pressure stage of the group of stages provided for their utilization, the blading which is provided as the only pressure stage for the low pressure gas portions.

Explosion turbines for carrying out the last-mentioned process are thus characterized by the combination of the arrangement of at least two nozzle and blading sets or groups, which by proper dimensioning of the expansion ratios and of the peripheral speeds, and if desired also by the provision of shields for individual blade rings of multi-ringed rotors, are adapted for utilizing different portions of the combustion gases generated during every cycle of an explosion chamber, that is, to utilize portions of different flow velocities, with the arrangement of at least two nozzle and blading sets or groups arranged one behind the other in pressure stages, in which combination a common blading group can serve as the second stage for one portion and as the only stage for the other portion. The nozzle and blading groups arranged in pressure stages thereby utilize the portions from the beginning of the expansion, there being obtained by subdivision of the pressure drop a reduction in the flow velocity and consequently a favorable relation between peripheral and flow velocities. On the other hand, the other nozzle and blading group utilizes in a single pressure stage the other portion discharged later in the expansion, the nozzle and bladings having expansion ratios and peripheral speeds which fit the greatly reduced flow velocities of this later gas portion. There thus occurs in the whole range of the expansion a relation between peripheral and flow velocity to which the nozzles and the bladings are almost perfectly fitted, so that correspondingly uniform and high efficiencies are to be expected.

In such sub-division of the combustion gas stream the following difficulties arise. As described in my copending application Ser. No. 186,094, after the explosion in the explosion chamber of an explosion turbine, and after the rapid opening of the outlet member (which is made as sudden as possible) the connecting conduit between the outlet member and the nozzle, and likewise the nozzle itself should be filled with the high pressure combustion gases as soon as possible in order to prevent expansion and whirling in advance of the nozzle, as otherwise considerable losses occur. It was therefore attempted in a great variety of ways to keep as small as possible the space in advance of the nozzle, which space I term the nozzle conduit or channel, and not only the volume of such conduit but also to its surface area, and I have succeeded in doing so.

To this end it is necessary to arrange the discharge end of the explosion chamber in the immediate vicinity of the rotor system operated by it. So long as only one rotor system is operated such an arrangement presents no difficulties. I have found, however, that if an additional turbine stage, or more turbine stages are to be operated directly from the explosion chamber, the conduit running from the explosion chamber to the additional turbine stages, and consequently the nozzle conduit, becomes inadmissibly large if the additional turbine stages are arranged upon the same side of the explosion chamber as the already present turbine stage. According to the invention, this difficulty is overcome and the volume and surface area of the nozzle conduit are limited to the smallest possible values, in a plant which includes a plurality of turbine stages, by arranging only the outlet end sections of the chamber or chambers, such sections containing the outlet members and the nozzle channels, between the turbine stages, while the main portion of the explosion chambers lies outside, i. e., beyond the circumferences of the turbine stages.

A particularly advantageous form of the invention is obtained when the turbine shafts of the turbine stages are journaled horizontally, while the explosion chamber lies with its longitudinal axis in vertical position; there is thus simultaneously obtained the possibility of coupling the rotor systems of the individual turbine stages in the simplest fashion by a common turbine shaft. The nozzle arrangements of the individual turbine stages may with advantage lie at the same elevation as the closure elements of the nozzle valves, so that the combustion gases after passing through the outlet opening of the chamber flow to the associated rotor without any change in direction.

The invention is illustrated by way of example on the accompanying drawings, wherein Figs. 1 and 2 show diagrammatically the relationship between the flow velocities and the output of the explosion gases per working cycle or rotor efficiency, and the relation between the peripheral rotor velocity and the gas flow velocity;

Fig. 3 is a horizontal section through a turbine arrangement according to the invention embodying the principles disclosed in Figs. 1 and 2 and is taken along the line III—III of Figs. 4 and 5;

Figs. 4 and 5 are vertical sections through the same turbine and are taken along the lines IV—IV and V—V of Fig. 3;

Figure 7:
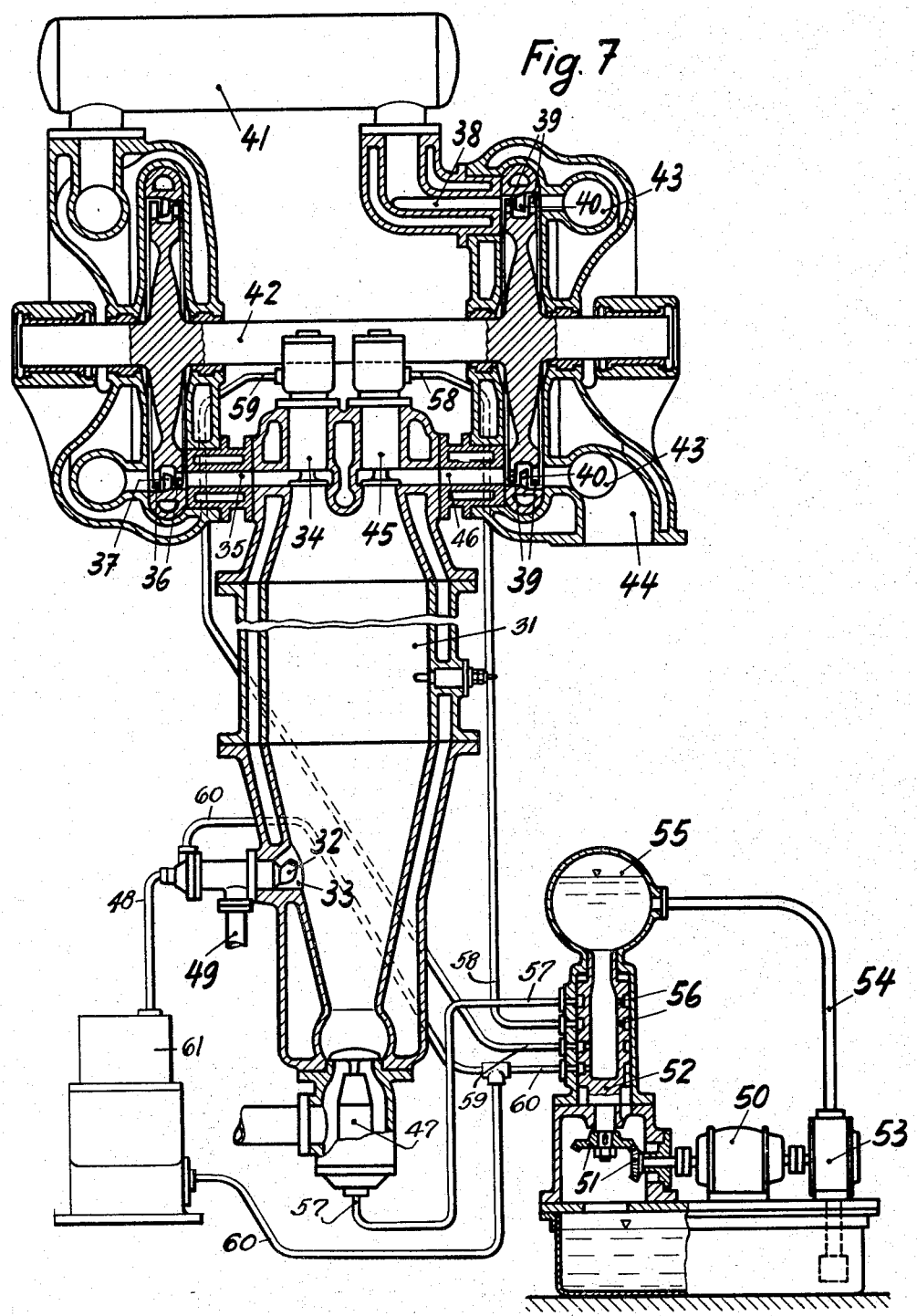

Fig. 6 is a longitudinal section through a turbine plant and shows a construction in which the high pressure portions of the explosion gases generated in each cycle of an explosion chamber, which gases are utilized in portions independently of each other, are divided into a plurality of pressure drops and utilized in different pressure stages, while the low pressure portions operate without pressure division a pressure stage which is fitted to their different conditions; and Fig. 7 shows a simplification of the arrangement shown in Fig. 6, the high pressure portions of the gases operating as their later or last pressure stage of the groups of stages provided for their utilization, the blading which serves as the only pressure stage for the low pressure gas portions.

Fig. 8 is a section along the line VIII—VIII of Fig. 4.

Fig. 9 is an enlarged section through the fuel-charging valve; and

Figs. 10 to 14 illustrate the condition of the valves at various phases of the working cycle.

Fig. 1 shows how the flow velocity of the explosion gases falls rapidly during the discharge of an explosion chamber. The abscissae indicate the percentage of the total mass of explosion gases generated per cycle which has been discharged up to any given instant. The ordinates indicate the percentage of the flow velocity, referred to the greatest attainable velocity, which prevails at such instant. The curve shows that the drop in the flow velocity occurs comparatively slowly over the greater part of the delivered capacity. Nevertheless, the drop in velocity is unfavorable both for the efficiency of the nozzle and for the efficiency of the rotor.

Fig. 2 shows how the fall in the flow velocity of the gases affects the rotor efficiency. The abscissae represent the ratio between the peripheral speed $u$ of the rotor and the flow velocities $c$ of the gases, while the ordinates represent the rotor efficiency $n$. The full line curve is for a rotor having two rings of blades, while the dash line curve is for the rotor with a single ring of blades.

In recognition of the disadvantages illustrated by these curves, it is provided, according to the invention, to divide the mass of combustion gases generated at every cycle of an explosion chamber into successive portions and to conduct the different portions to separate nozzles which are fitted to the different conditions of the said portions by suitable dimensioning of their expansion ratios. In addition, each combustion gas portion is conducted only through a rotor system whose peripheral velocity is fitted to the flow velocities of the combustion gas portions operating the same.

Fig. 1 shows my improved method of operation for the case in which the explosion gases produced during every cycle of an explosion chamber are utilized in four different portions. First, the combustion gas portion I between the conditions 1 and 2 are utilized, then the portion II between the conditions 2 and 3, then the portion III between the conditions 3 and 4, and finally the portion IV from the condition 4 on. The flow velocity of the portion I is greater than that of portion II; the velocity of portion II is greater than that of portion III, and the velocity of III is greater than that of IV, assuming that they are expanded down to approximately the same back pressure. In order to obtain during the utilization of the gas portion II the nozzle and rotor efficiency which is obtained by the utilization of the gas portion I, the expansion ratio of the nozzle fed with the gas portion II must be different from that of the nozzle which utilizes the gas portion I, and must, in fact, be smaller than the expansion ratio of the latter nozzle. The peripheral velocity of the blades operated by the gas portion II must likewise be different from that of the blades operated by gas portion I, and for attaining the same favorable relationship between peripheral velocity and flow velocity it must be smaller than the peripheral velocity of the blades operated by gas portion I. What has been said in connection with gas portions I and II applies also to gas portions II and III, and III and IV. Whereas heretofore a single nozzle and a single blading (at the same counter pressure) were provided for the whole quantity of explosion gases I, II, III, IV, whose expansion ratio or rated peripheral speed, respectively, yielded the highest efficiency only at a definite flow velocity, so that when the gas velocity was different from this definite velocity the efficiency fell below this maximum efficiency, according to the invention, the nozzle and blading systems destined for use with the different gas portions I, II, III, and IV can be so dimensioned as regards their expansion ratios and peripheral speeds with reference to the flow velocity of the respective gas portions that a uniform efficiency is obtained over the whole range of expansion which has only slight variations from the optimum efficiency.

It was mentioned above that the blading operated by the gas portion II must have a different, and in fact, a smaller, peripheral velocity than the blading operated by the gas portion I. This applies naturally to a still higher degree for the blading operated by the gas portion III in relation to the blading operated by the gas portion I. While the difference in the flow velocities of the gas portions I and III can be compensated only by the use of different peripheral speeds, this difference is so small in the case of portions I and II, or III and IV, that the difference between the efficiency of single blade ring and two-blade ring rotors (see Fig. 2) with the same ratio between peripheral and flow velocities can be utilized to make up for this difference in flow velocities while simultaneously greatly simplifying the turbine construction. Thus I have found that a single blade ring rotor yields a better efficiency at a lower gas velocity than a two-blade ring rotor which operates at the same peripheral velocity with combustion gases at higher flow velocity. Consequently, it is not necessary for the nozzles of different expansion ratios which receive the gas portions I and II, or III and IV, to direct the gases against different rotors of different peripheral velocities; it suffices to shield the blade ring or rings to the rear of the first ring in the range of the nozzle which employs the combustion gas portions II or IV when all of the blade rings of the same rotor are operated by the gas portions I or III.

Figs. 3, 4, and 5 illustrate a turbine plant embodying the above-mentioned principles and thereby simplified to a considerable degree. The numeral 16 indicates the outlet member of the explosion chamber 20 which discharges the combustion gas portion I directly after the explosion into the nozzle 21 having a comparatively large expansion ratio. The outlet member 16 thus opens at the point 1 in Fig. 1 and closes at the point 2. The gases charged by the nozzle 21 strike the two-blade ring Curtis rotor 26, a ring of reversing blades 27 being provided to effect the necessary reversal of the gases. After the outlet member 16 has closed at the instant 2, the outlet member 17 is opened and discharges the combustion gas portion II through the nozzle 22 against rotor 26. Corresponding to the lower flow velocity of the gas portion II, the nozzle 22 has a lower expansion ratio than the nozzle 21. As the rotor 26 has the same peripheral speed at the nozzle 22 as at the nozzle 21, the reduced flow velocity is compensated according to the invention by the provision of a shield 28 for the rear blade ring, which shield replaces the reversing blades 27 at such place, and prevents access of the combustion gases coming from the nozzle 22 to such rear blade ring, the gases being directed into an exhaust conduit 28a. This shield and the exhaust conduit are best shown in Fig. 8. Thus only the first row of blades of the Curtis rotor 26 is impinged, whereby corresponding to the showing in Fig. 2, approximately the same rotor efficiency is to be expected as occurs at the nozzle 21 whose higher velocity gases impinge all of the blade rings.

At the instant 3 (Fig. 1) the outlet member 17 closes and the outlet member 18 opens, the latter discharging the gas postion III through the nozzle 23 to the two-blade ring Curtis rotor 29, with which is associated a row 30 of reversing blades. The flow velocities of the combustion gas portion III are so reduced in comparison with those of the combustion gas portions I and II, that not only is a considerable reduction in the expansion ratio of the nozzle 23 necessary as compared with nozzles 21 and 22, but also a corresponding reduction in the peripheral speed of the Curtis wheel 29. If the Curtis wheels 26 and 29, as indicated in Figs. 4 and 5, are coupled by a common shaft, the reduction in the peripheral speed of the wheel 29 is accomplished by a suitable reduction in its diameter in comparison with the diameter of the rotor 26, the blade rings being thus at different distances from the common rotor shaft (not shown). Figs. 4 and 5 indicate this deduction in diameter of the rotor 29 as against the rotor 26.

At the instant 4 (Fig. 1) the outlet member 18 closes and the outlet member 19 opens. The combustion gases flow to the first ring of blades of the Curtis rotor 29 through a nozzle 24; the second ring of blades of the rotor 29 is guarded by a shield 25 against impingement by the combustion gases. The nozzle 24 is only slightly widened or not at all, as directly after the instant 4, that is, after a rather small pressure drop the scavenging of the explosion chamber begins by the admission of air at the opposite, inlet end of the chamber, so that the nozzle 24 serves mainly for discharging the residual gases in the chamber which are at approximately the pressure of the charging air.

Figs. 6 and 7 show sections through two different turbine plants in which the first high pressure portion of the gases, which are generated during every cycle of an explosion chamber and are utilized in two portions independently of each other, is divided with respect to its pressure drop and is utilized in two pressure stages, while the low pressure portion strikes a pressure stage without pressure sub-division, such stage being adapted to the condition of the gases. Numeral 31 represents an explosion chamber into which the fuel is introduced through the fuel inlet member 32 (Fig. 7). The air entering simultaneously through the port 33 atomizes the fuel, so that an explosive mixture forms in the chamber 31 which is ignited by suitable igniting mechanism. Very shortly after the explosion, the outlet member 34 (Fig. 6) is opened. The high pressure combustion gases flow through the nozzle 35 to the Curtis wheel 36 having two rings of blades; a ring of reversing blades 37 effects the necessary reversal of the combustion gas stream. Only a partial expansion, however, takes place because the nozzle 38, which conducts the combustion gases to a second, two-blade ring Curtis rotor 39a, is so dimensioned, that in the interposed pressure equalizer 41 a definite intermediate pressure is maintained. The capacity for work which the combustion gases still possess at this intermediate pressure is converted into velocity energy in the nozzle 38 and is delivered in the Curtis wheel 39a to the common shaft 42. The gases expanded to atmospheric pressure flow through the exhaust channel 43 into the atmosphere, or they may be used in any suitable manner. As soon as the pressure of the combustion gases in the explosion chamber 31 has fallen to a pressure which cannot be economically utilized in two-pressure stages, the outlet member 34 is closed and the outlet member 45 is opened. The combustion gases now flow through nozzle 46 directly against the Curtis wheel 39, are expanded in the latter down to atmospheric pressure and flow through the exhaust conduit 44 into the atmosphere. As soon as the pressure of the combustion gases in the chamber 31 has fallen to approximately the pressure of the air in advance of the scavenging air valve 47 (Fig. 7), the latter is opened and the incoming air drives the residual combustion gases through the open outlet member 45. The member 45 then closes and a new charge of fuel is introduced through the fuel conduit 48 and atomizing air is charged through conduit 49 into the explosion chamber 31 in the manner above described and a new cycle is begun.

The mode of operation of the apparatus illustrated takes place in such manner that the high pressure portion of the gases produced during each cycle of an explosion chamber and discharged through the outlet member 34, is utilized in the turbine pressure stages 36 and 39a (Fig. 6). Thus the pressure drop of the high pressure gas portion discharged through the member 34 is divided, so that correspondingly reduced flow velocities occur whose relation with respect to the peripheral velocity of the turbine rotors 36 and 39a is so determined by suitable dimensioning of the intermediate pressure in the pressure equalizer 41, that upon utilization of this gas portion favorable efficiencies are obtained in both the turbine rotor 36 and 39a. On the other hand, the combustion gas portion of low pressure discharged by the member 45 is utilized in a single pressure stage, namely, the rotor 39. The expansion ratio of the nozzle 46 and the peripheral velocity of the turbine rotor 39 are again so determined that upon utilization of the low pressure gas portion discharged by member 45, high efficiency is obtained in the rotor.

Fig. 7 shows a simplification of the structure shown in Fig. 6, in that the blading of the rotor 39 forms part of the two pressure stage arrangement 35, 36 and 38, 39 utilizing the gas portion of higher pressure, and simultaneously forms part of the arrangement 35, 36 and 46, 39, which divides the gases as to quantity; the nozzle and blading 35, 36 thus couple both arrangements. This structural simplification does not of itself, however, form the essence of the invention. A separate blading could, for example, be provided for the nozzle 38 completely independent of the blading associated with the nozzle 46. Furthermore, the valves 47 and 32 could be combined, so that scavenging and charging could be effected at the same pressure and in a single step, as described in my copending application Ser. No. 404,688, which issued on August 6, 1935 as Patent No. 2,010,020.

The fuel valve is shown in detail in Fig. 9 and receives fuel from the conduit 48 leading from the pump 61, the fuel passing through the axial bore 32a in the stem of the valve and finally emerging from the head of the valve into the space 33. At the same time operating oil under pressure entering from conduit 60 into the valve cylinder 60a acts upon the piston 60b and raises the air valve 60c from its seat, whereupon supercharging air flows from the conduit 49 past the valve head 32 and through the space 33 at high velocity, so that favorable conditions are created for the atomization of the fuel. The construction and operation of this valve are shown and described in United States Patents Nos. 1,786,946 and 1,763,154.

Figs. 10 to 14 illustrate the operation of the various valves of an explosion chamber. In Fig. 10 the valves 34, 45 and 47 are closed, while the valve 32 is open and feeds fuel and supercharging air into the chamber. In Fig. 11 all the valves are closed and the ignition means, shown as a spark plug, is fired, as indicated by the dotted circles about such plug. Fig. 12 shows the condition of the chamber immediately after the explosion, the valve 34 being open and the gases flowing to the nozzle 35 and bladings 36 and 37 (Fig. 7). In Fig. 13 the valve 34 has been closed and the combustion gases now flow at reduced pressure through the open valve 45 to the nozzle 46 and bladings 39 and 40 (Fig. 7). The scavenging step is illustrated in Fig. 14, the valve 47 being then open and the residual gases being expelled through the valve 45.

What has been said above with regard to the division of the explosion gases into two pressure stages and into two portions, applies obviously to more pressure stages and more gas portions. In every case, however, it is possible to simplify the construction by causing the high pressure portions, utilized in a plurality of pressure stages, to strike, as their last pressure stage, the blading which is associated with a lower pressure portion as the single pressure stage; that is, at least one blading can always be common to two arrangements dividing the gases according to pressure and volume in addition to the blading coupling the two arrangements.

Finally, it is an important feature of the invention that one of the high pressure combustion gas portions is utilized in a plurality of pressure stages; a second gas portion of lower pressure is utilized in a plurality of pressure stages but in less than the first mentioned portion; while a third combustion gas portion, and if desired, also the remaining portions, if any, are utilized in a single pressure stage. It is likewise possible to work the combustion gas portions of stepped flow velocity in different pressure stages, while only the subsequent combustion gas portions are utilized in a pressure stage. This procedure can be continued at will without altering the essential inventive idea.

It will be understood that suitable mechanism is provided for timing the opening of the outlet valves of the combustion chamber or chambers to obtain the sequential discharge of different portions of the explosion gases generated by each charge. I prefer to employ a hydraulic controller of the type described in my United States Patent No. 877,194.

It will be apparent that the turbine 39 of Fig. 7 may be made of smaller diameter than turbine 36 should such variation prove desirable under certain conditions, as when the pressure of the air charged into the explosion chamber 31, and hence the explosion pressure, is changed. The nozzles 35, 38 and 46 are obviously of the expansion type shown in Fig. 3 and it is not believed to be necessary to show the same in detail.

Fig. 7 shows the hydraulic controller which operates the different valves. The electric motor 50 drives through the gearing 51 the revolving drum 52 and the oil pump 53. The pressure oil flows through the pipe 54 to the equalizer 55 and into the hollow interior of the drum 52. During one revolution of the drum 52 the pressure oil is intermittently admitted to the pipes 57 to 60 by means of holes 56 thus operating the corresponding valve mechanism in well known manner.

I claim:

1. An explosion turbine plant comprising a stationary, constant volume explosion chamber adapted to receive intermittently charges of fuel and air for explosion therein, reciprocating valve mechanism for discharging the high pressure, high temperature gases generated in such chamber, means for operating and timing said valve mechanism to effect discharge of the explosion gases in separate successive portions each of a pressure above that of the scavenging air, nozzles and bladings associated with said valve mechanism and arranged to receive each a different gas portion directly as said portions discharge in sequence from said chamber, conduits connecting said valve mechanism and said nozzles, and intermittently operated valve means for charging scavenging air into the chamber, the operating and timing means for said valve mechanism keeping such mechanism closed from the termination of the scavenging until after the ignition, and the outlet end section of the explosion chamber containing the outlet valve mechanism being arranged between two turbine bladings, whereby the size of the conduits is kept small, the main body of the explosion chamber lying externally of the periphery of said bladings.

2. An explosion gas turbine as set forth in claim 1, wherein the explosion chamber is of elongated form and is arranged with its longitudinal axis in a plane transverse to the shaft of the rotor bladings.

3. An explosion gas turbine as set forth in claim 1, wherein the nozzles associated with the rotor bladings are arranged at substantially the same elevation as the respective outlet valves in advance of the same, said conduits being thereby of minimum length and the gases undergoing a minimum change in direction on their way to the nozzles.

4. An explosion gas turbine as set forth in claim 1, wherein the explosion chamber is arranged with its outlet end portion within the periphery of at least one of the bladings, the valve mechanism extending toward the axis of the rotor.

HANS HOLZWARTH.